US005548737A

United States Patent [19]

Edrington et al.

[11] Patent Number: 5,548,737
[45] Date of Patent: Aug. 20, 1996

[54] DYNAMIC LOAD BALANCING FOR A MULTIPROCESSOR PIPELINE BY SORTING INSTRUCTIONS BASED ON PREDETERMINED EXECUTION TIME

[75] Inventors: Jimmie D. Edrington, Georgetown; Mark A. Einkauf, Leander; Allen P. Jensen; Michael T. Vanover, both of Austin, all of Tex.

[73] Assignee: International Business Machines Corporation, Armonk, N.Y.

[21] Appl. No.: 421,632

[22] Filed: Apr. 11, 1995

Related U.S. Application Data

[63] Continuation of Ser. No. 184,894, Jan. 21, 1994, abandoned, which is a continuation of Ser. No. 727,790, Jul. 10, 1991, abandoned.

[51] Int. Cl.[6] .............................. G06F 9/445; G06T 1/20
[52] U.S. Cl. ........................ 395/375; 395/650; 395/163
[58] Field of Search ..................................... 395/375, 650, 395/775, 163

[56] References Cited

U.S. PATENT DOCUMENTS

| | | |
|---|---|---|
| 3,905,023 | 9/1975 | Perpiglia . |
| 4,099,235 | 7/1978 | Hoschler et al. ...................... 395/650 |
| 4,229,790 | 10/1980 | Gilliland et al. . |
| 4,384,324 | 5/1983 | Kim et al. . |
| 4,403,286 | 9/1983 | Fry et al. ............................... 395/650 |
| 4,493,019 | 1/1985 | Kim et al. . |
| 4,493,020 | 1/1985 | Kim et al. . |
| 4,495,562 | 1/1985 | Yamaji et al. . |
| 4,504,909 | 3/1985 | Acharya et al. . |
| 4,543,626 | 9/1985 | Bean et al. . |
| 4,633,387 | 12/1986 | Hartung et al. . |
| 4,736,291 | 4/1988 | Jennings et al. . |
| 4,766,566 | 8/1988 | Chuang . |
| 4,814,978 | 3/1989 | Dennis . |
| 4,839,798 | 6/1989 | Eguchi et al. . |
| 4,847,755 | 7/1989 | Morrison et al. ...................... 395/650 |
| 4,850,027 | 7/1989 | Kimmel . |
| 4,875,161 | 10/1989 | Lahti . |
| 4,920,487 | 4/1990 | Baffes ................................... 395/650 |
| 4,930,102 | 5/1990 | Jennings . |
| 5,115,505 | 5/1992 | Bishop et al. ......................... 395/650 |
| 5,133,077 | 7/1992 | Karne et al. .......................... 395/800 |
| 5,202,987 | 4/1993 | Bayer et al. .......................... 395/650 |
| 5,287,466 | 2/1994 | Kodama ................................ 395/800 |

OTHER PUBLICATIONS

IBM TDB, "Parallel Handling of Logically Serial Task", vol. 35, No. 4, Sep. 1990, pp. 368–370.
IEEE Transactions on Acoustics, Speech and Signal Processing, vol. 35, No. 9, Sep. 1987, New York, "Pipeline Interleaved Programmable DSP's: Synchronous Data Flow Programming", E. A. Lee et al, pp. 1334–1345.
Proceedings of the 1986 International Conference on Parallel Processing 19, Aug. 1986, St. Charles Illinois, J. H. Moreno et al, pp. 285–292. "Replication and Pipelining in Multiple–Instance Algorithms".

Primary Examiner—Richard L. Ellis
Attorney, Agent, or Firm—Paul S. Drake; Volel Emile

[57] ABSTRACT

An apparatus for processing high level instructions including a plurality of processing units, means for generating a plurality of instructions to perform said high level instructions, and means for dynamically organizing said generated instructions into at least one group, each group including at least one instruction to be processed by one of said processing units. In addition, a method of processing high level instructions by a plurality of processing units including generating a plurality of instructions to perform said high level instructions, and dynamically organizing said generated instructions into at least one group, each group including at least one instruction to be processed by one of said processing units.

28 Claims, 14 Drawing Sheets

PROCESSOR 2 DATA STRUCTURE

CONFIGURATION LIST

| PID | TIME | RESTRICTIONS |
|---|---|---|
|  | 40 | - |
|  | 60 | - |
|  | 30 | - |
|  | 20 | - |
|  | 100 | - |
| CID |  |  |

FIG. 10

CONFIGURATION CACHE ENTRY

| | |
|---|---|
| CONFIGURATION ID = | 1165 |
| NEXT CONFIGURATION CACHE ENTRY = | 1170 |
| PROCESS STACKS | 1175 |
| PROCESS STACK POINTERS | 1180 |
| PROCESS STACK LOAD FLAGS | 1185 |
| OTHER | 1190 |

| PID | ADDRESS | SIZE | TIME | RESTRICTIONS | INITIALIZATION |
|-----|---------|------|------|--------------|----------------|
| 0 | | | | | |
| 1 | | | | | |
| 2 | | | | | |
| 3 | | | | | |
| 4 | | | | | |
| n-1 | | | | | |
| n | | | | | |

ROUTINE TABLE

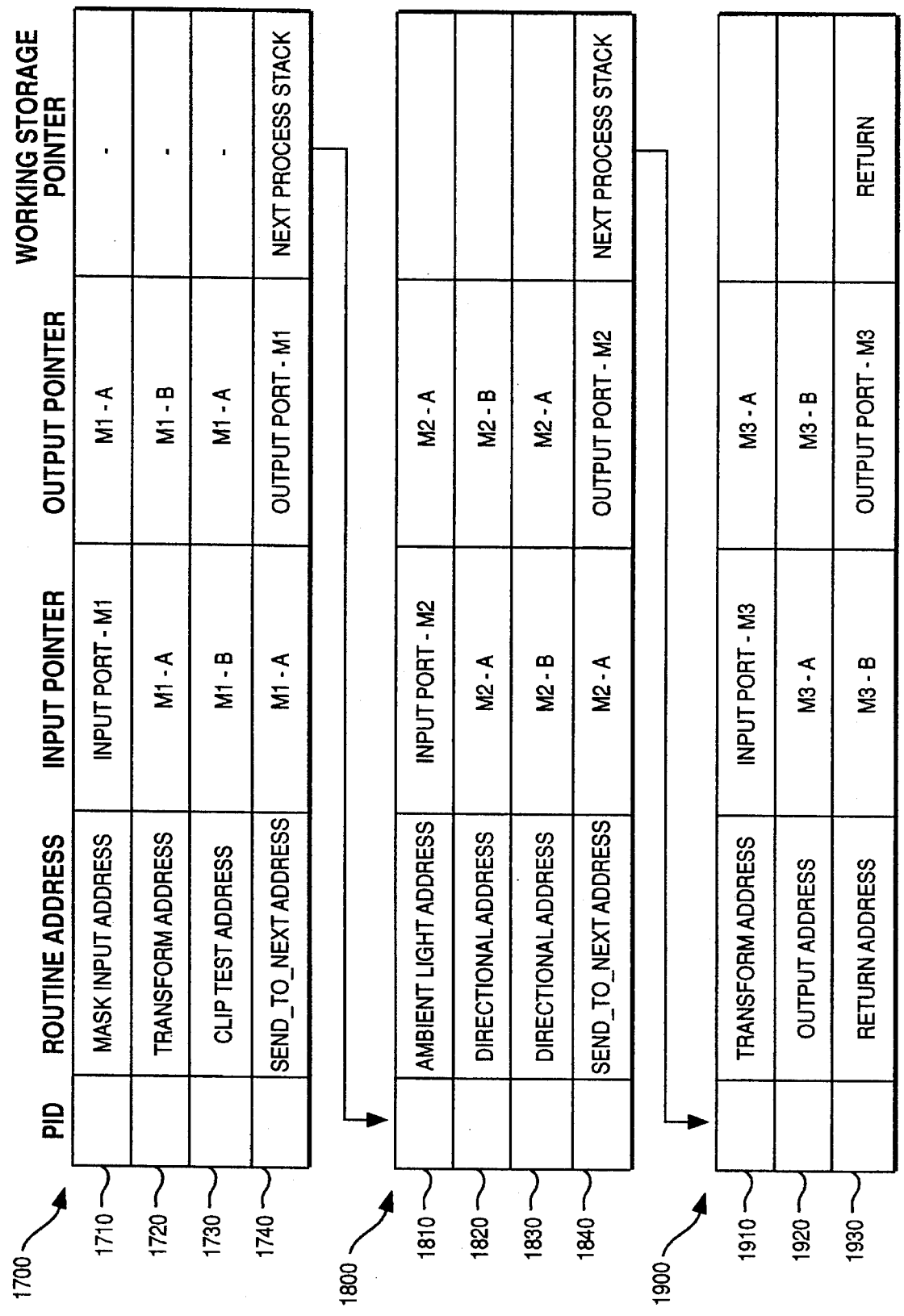

DYNAMIC LOAD BALANCING FOR A MULTIPROCESSOR PIPELINE BY SORTING INSTRUCTIONS BASED ON PREDETERMINED EXECUTION TIME

This is a continuation of application Ser. No. 08/184,894 filed on Jan. 21, 1994 now abandoned which is a continuation of Ser. No. 07/727,790 filed on Jul. 10, 1991 now abandoned.

TECHNICAL FIELD

The present invention relates generally to parallel computing and more specifically to dynamically balancing a processing load across a multiprocessor pipeline.

BACKGROUND ART

Many types of processor, memory, bus, and other resource configurations have been utilized in the prior art to provide parallel and pipeline processing. These configurations include systems for multiple processors to utilize shared memory or systems for processors to share a parallel workload.

Various configurations and techniques used for parallel and pipeline processing are described below.

U.S. Pat. No. 4,930,102 is directed to a computer architecture utilizing parallel processors that includes an interface system between the various physical components and a queueing structure for holding waiting activities. More specifically, this computer architecture includes a cross-bar circuit and a accordian-store queue structure.

U.S. Pat. No. 4,920,487 is directed to a parallel processing computer system with multiple processing units and shared memory which balances the aggregate computational load by utilizing a network having identical computations to be executed at each connection therein.

U.S. Pat. No. 4,875,161 is directed to a vector file organization to support multiple program execution pipelines. Each of the pipelines can simultaneously access various blocks of a vector file through segmenting the file storage and by addressing the various elements of the segments.

U.S. Pat. No. 4,850,027 is directed to an image processing system with limited processing element connections that provides many image processing network choices without massive memory and bus capacity.

U.S. Pat. No. 4,839,798 is directed to a computer network system with a plurality of online connected computer systems. Each computer system can request transfer of a job to another computer system.

U.S. Pat. No. 4,814,978 is directed to a computer design utilizing large numbers of VLSI circuit chips. This design is a static dataflow architecture in which a plurality of processing elements communicate externally by means of I/O circuitry and internally by means of packets sent through a routing network that implements a transmission path from any processing element to any other processing element.

U.S. Pat. No. 4,766,566 is directed to a RISC type VLSI processor using dual parallel execution units. The load between the dual units may be balanced by adding an adder, a multiplier, or an ALU to the units.

U.S. Pat. No. 4,736,291 is directed to a general purpose array processor which includes a plurality of independent processing units for processing seismic data stored in a bulk memory. A digital host computer provides the overall control of the system through a host interface unit.

U.S. Pat. No. 4,633,387 is directed to a multiunit data processing system, such as a multicontrol unit peripheral data storage system, in which a busier unit may transfer work to a less busy unit based on a request for work from the less busy unit.

U.S. Pat. No. 4,543,626 is directed to a control arrangement for coordinating operations of multiple processors in a multiprocessor system in response to a command. Each received command is associated with a predetermined route including route vectors. A control block is generated for the route. Each route vector identifies an operation to be executed and the station to execute the operation. Each station has a work queue containing control blocks which the station retrieves and processes sequentially.

U.S. Pat. No. 4,504,909 is directed to an array processor for real time processing of acquired data from a CT scanner. In this system, processing of subportions of a given array is interleaved with inputting of acquired data sets for the next array.

U.S. Pat. No. 4,495,562 is directed to a controlling method for a parallel processing system wherein the used time periods of a processor are periodically measured for determining workloads.

U.S. Pat. No. 4,493,020 is directed to a microprogrammed data processing system in which each high level instruction is performed by one or more tasks and each task is then performed by executing one or more task microinstructions in a microprogrammed manner. Three separate processors operate 120 degrees out of phase with each other while sharing the same physical hardware such as memory. Resources to the processors are allocated on demand based on the status of allocatable registers.

U.S. Pat. No. 4,493,019 is directed to a microprogrammed data processing system having a three stage high point architecture implemented for executing microinstructions using three separate processors operating 120 degrees at a phase with one another.

U.S. Pat. No. 4,384,324 is directed to a microprogrammed data processing system having a three stage high point architecture implemented for executing microinstructions using three separate processors operating 120 degrees at a phase with one another.

U.S. Pat. No. 4,229,790 is directed to a system for concurrent processing of tasks and instructions. The processor is a multiple instruction multiple data screen digital computer that utilizes pipelining for control and function units but avoids precedence constraint penalties.

U.S. Pat. No. 3,905,023 is directed to a multiprogrammed multiprocessing information processing system having independently operating computing, I/O and memory modules through an exchange.

DISCLOSURE OF THE INVENTION

The present invention includes an apparatus for processing high level instructions including a plurality of processing units, means for generating a plurality of instructions to perform said high level instructions, and means for dynamically organizing said generated instructions into at least one group, each group including at least one instruction to be processed by one of said processing units.

In addition, the present invention includes a method of processing high level instructions by a plurality of processing units including generating a plurality of instructions to perform said high level instructions, and dynamically organizing said generated instructions into at least one group, each group including at least one instruction to be processed by one of said processing units.

A further understanding of the nature and advantages of the present invention may be realized by reference to the remaining portions of the specification and the drawing.

BRIEF DESCRIPTION OF THE DRAWINGS

FIGS. 10 and 11 are illustrations of a configuration list and a routine table:

FIG. 13 is an illustration of a configuration cache entry;

FIG. 19 illustrates a set of process stacks for execution.

BEST MODE FOR CARRYING OUT THE INVENTION

Figure 1:
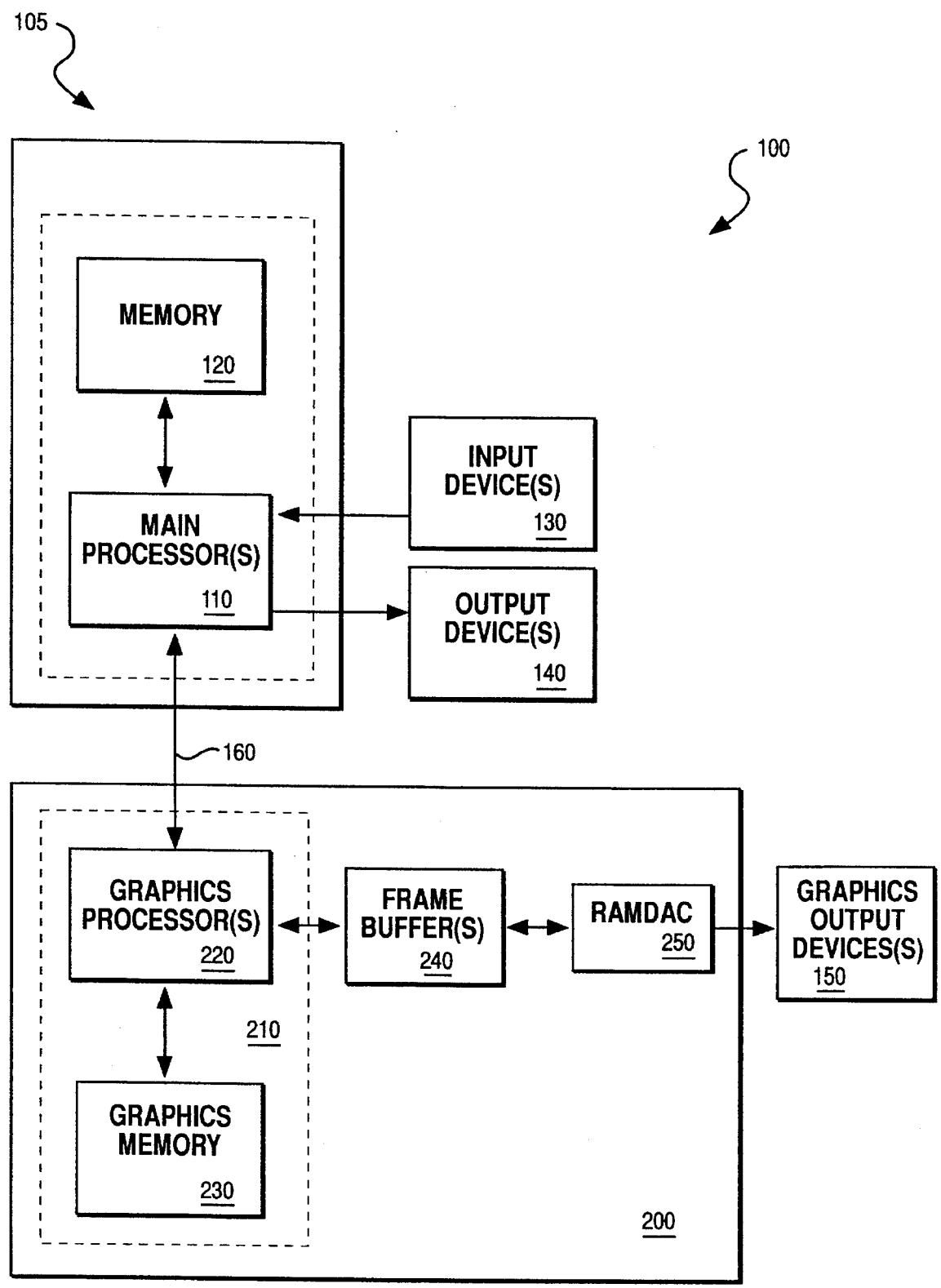
FIG. 1 is a block diagram of a typical digital computer.

FIG. 1 is a block diagram of a typical digital computer system 100. The computer system includes a host computer 105. The host computer includes main processor(s) 110 coupled to a memory 120, thereby comprising main pipeline 125, input device(s) 130 and output device(s) 140. Maid processor(s) 110 may include a single processor or multiple processors. Input device(s) 130 may include a keyboard, mouse, tablet or other type of input devices. Output device(s) 140 may include a text monitor, plotter or other types of output devices. The host computer main processor may also be coupled to graphics output device(s) 150 such as a graphics display through a graphics adapter 200. Graphics adapter 200 receives instructions regarding graphics from main processor 110 on bus 160. These instructions include attributes, such as the number and location of lights, and tasks such as render a triangle, polyline, or the like. The graphics adapter then executes those instructions in a graphics pipeline 210 which includes graphics processor(s) 220 and graphics memory 230. The graphics pipeline then executes those instructions and updates frame buffer(s) 240 based on those instructions. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
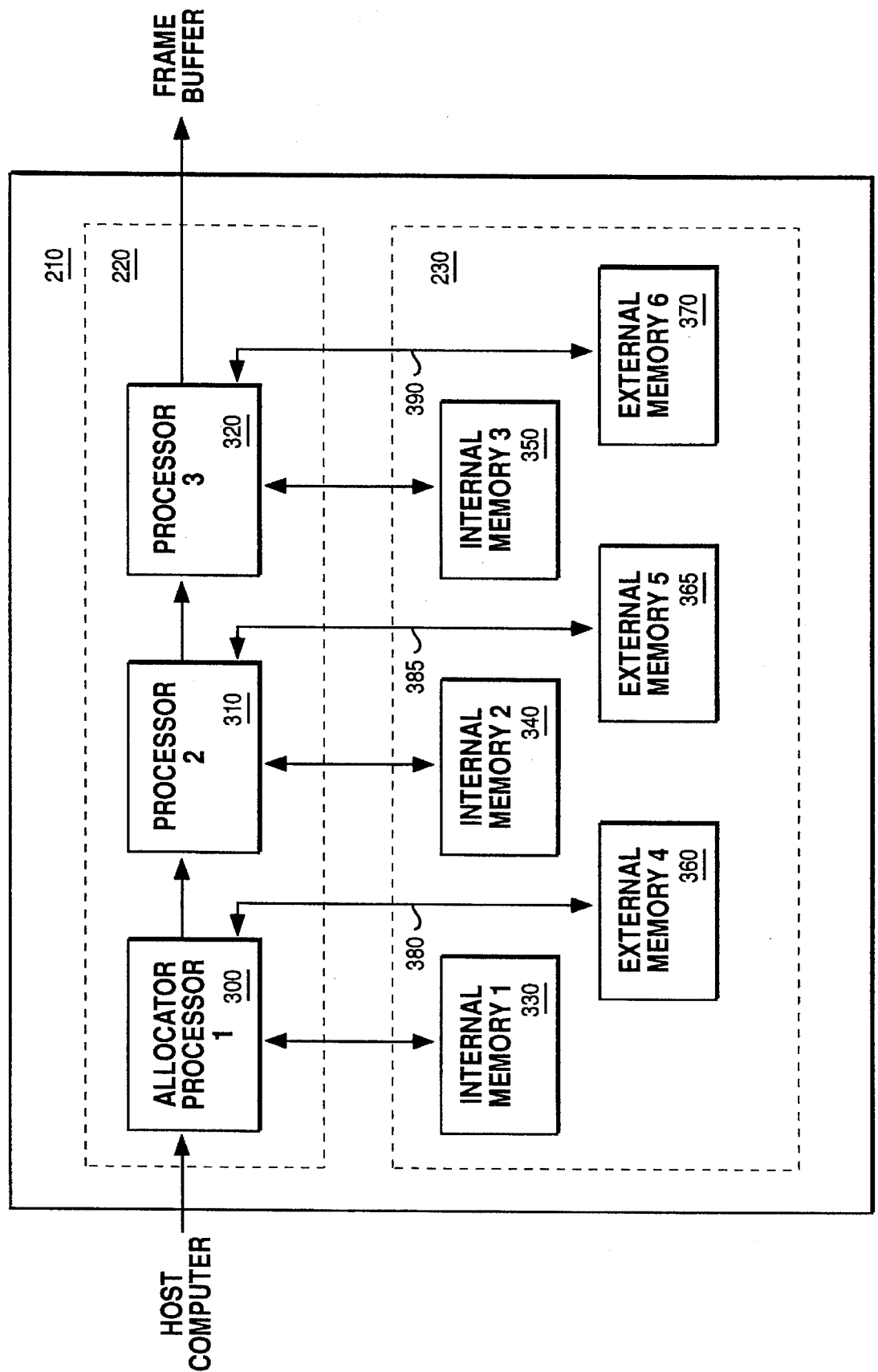
FIG. 2 is a block diagram of a possible graphics pipeline utilizing a preferred embodiment of the invention.

FIG. 2 is a block diagram of a possible graphics pipeline 210 utilizing a preferred embodiment of the invention. The graphics processor pipeline includes three processors 300, 310 and 320. Alternative pipelines may include more or fewer processors. In addition, the main pipeline or other pipelines besides the graphics pipeline may utilize an embodiment of the invention. Furthermore, each processor may be viewed as a processing unit wherein each unit may contain multiple processors grouped together as a pipeline, parallel processors, or the like. The first processor 300 is utilized as an allocator for distributing the workload across the pipeline. Alternative pipelines may have an allocator preceding the pipeline. The memory includes internal memories 330, 340 and 350 plus external memories 360, 365 and 370. Each of the internal memories is tightly coupled to a processor to provide a small and quick storage of frequently used information. Each of the external memories contains information that requires more storage or is less frequently used by the processors. External memories 360, 365 and 370 are coupled to processors 300, 310 and 320 by buses 380, 385 and 390, respectively.

Figure 3:
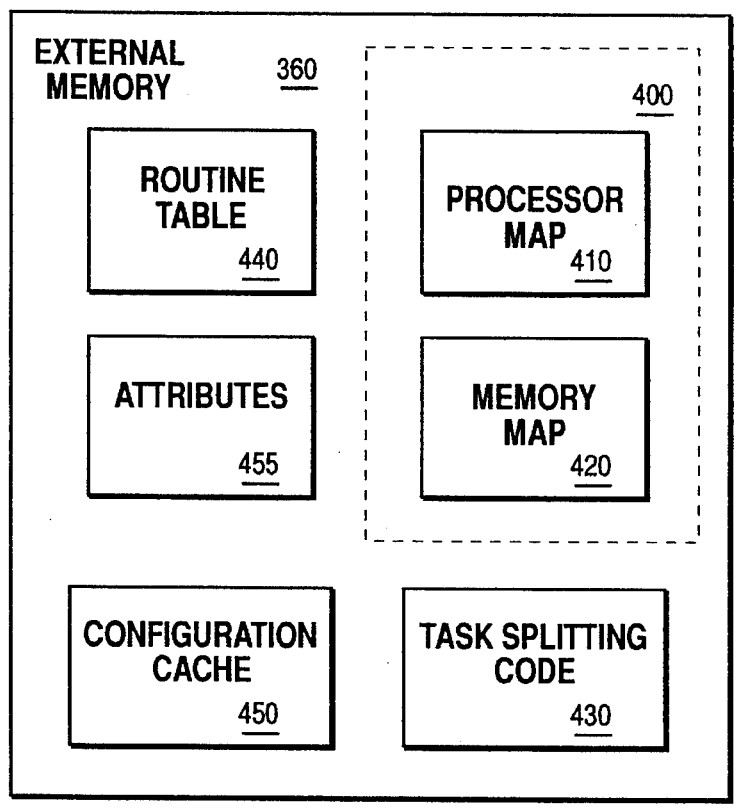
FIG. 3 is a block diagram of a memory storing a pipeline map and other information useful for allocating routines to the processing pipeline.

FIG. 3 is a block diagram of a memory such as external memory 360 storing a pipeline map 400, task splitting code 430, a routine table 440, and a configuration cache 450 for use in allocating routines to the processing pipeline in the preferred embodiment. An attribute buffer stores attributes used by the pipeline such as window location, transforms, light information, etc. The pipeline map 400 includes a processor map 410 and a memory map 420. Processor map 410 includes a processor data structure for each processor in the pipeline that is allocated routines for execution. If the allocator may execute routines as a processor in the pipeline, then there is a data structure for the allocator as well. Memory map 420 includes a memory data structure for each memory within the pipeline. The maps are described in more detail below in FIGS. 4 and 5. Also included in the internal memory is task splitting code 430, routine table 440, and configuration of cache 450. The task splitting code includes code for generating routines or instructions for each task or high level instruction that the processor pipeline may be instructed to perform, thereby splitting up the task or high level instruction into a set of routines or instructions. For example, a triangle rendering task may be split into input, transform, clip, light, transform, and output routines to be executed in sequence. Routine table 440 includes a list of possible routines or instructions to be executed by process ID (PID). Each routine entry includes information about the routine that is utilized during the allocation process. The routine table is described in greater detail below. Configuration cache 450 includes a list of previously configured tasks. Current attribute buffer 455 contains the current attributes that have been forwarded to the adapter from the application software such as the number and location of lights. Task splitting code 430, routine-table 440 and configuration cache 450 are described in more detail below.

Figure 4:
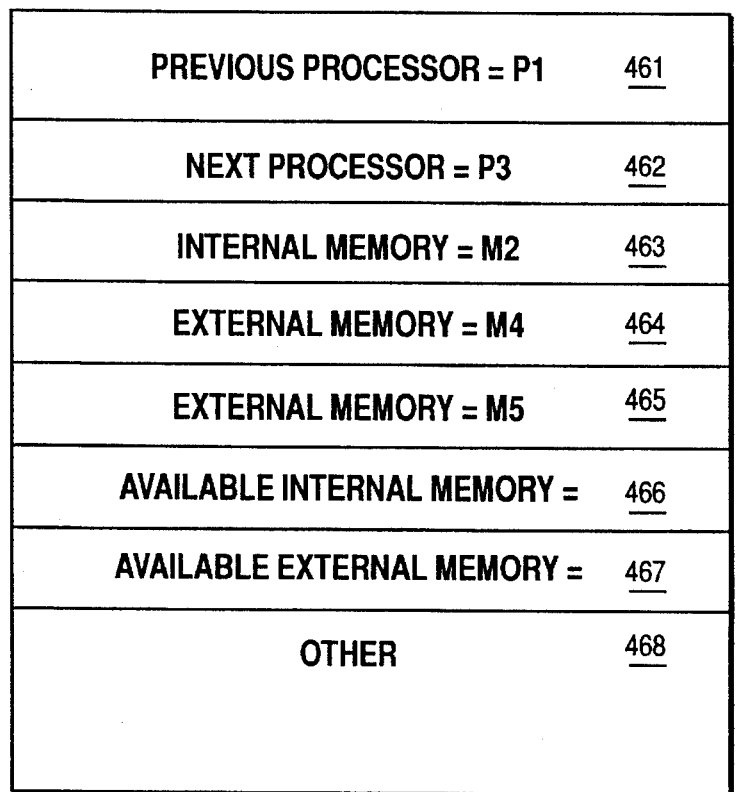
FIGS. 4 and 5 give examples of data structures that may be utilized in the pipeline map illustrated in FIG. 3 above.
Figure 5:
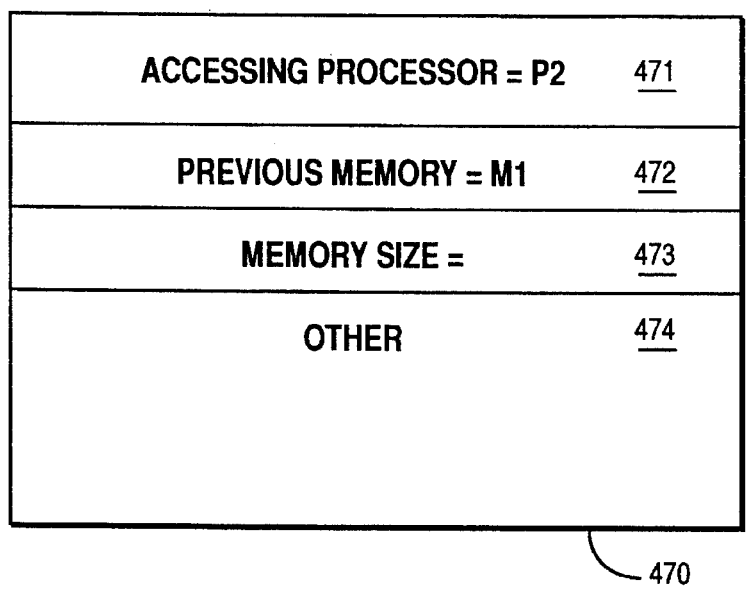

FIGS. 4 and 5 give examples of data structures that may be utilized for processors and memories in pipeline map 400 illustrated in FIG. 3 above. Processor data structure 460 illustrates a potential data structure for processor P2 shown in the pipeline illustrated in FIG. 2 above. This data structure includes pointers 461–465 to previous processor P1, next processor P3, internal memory M2 and external memories M4 and M5, respectively. The data structure also includes the amount of internal and external memory 466 and 467 assigned to the processor in words. This data structure can also include other information 468 to be utilized such as processor speed. Memory data structure 470 illustrates a potential data structure for memory M4 illustrated in FIG. 2 above. This memory data structure includes the amount of memory 473 in words and pointers 471 to the processor(s) that may use the memory. The memory data structure may also include a pointer 472 to a previous memory in the pipeline for use in the Load step for stepping through memories to locate data. The data structure may include other information 474 to be utilized.

Figure 6:
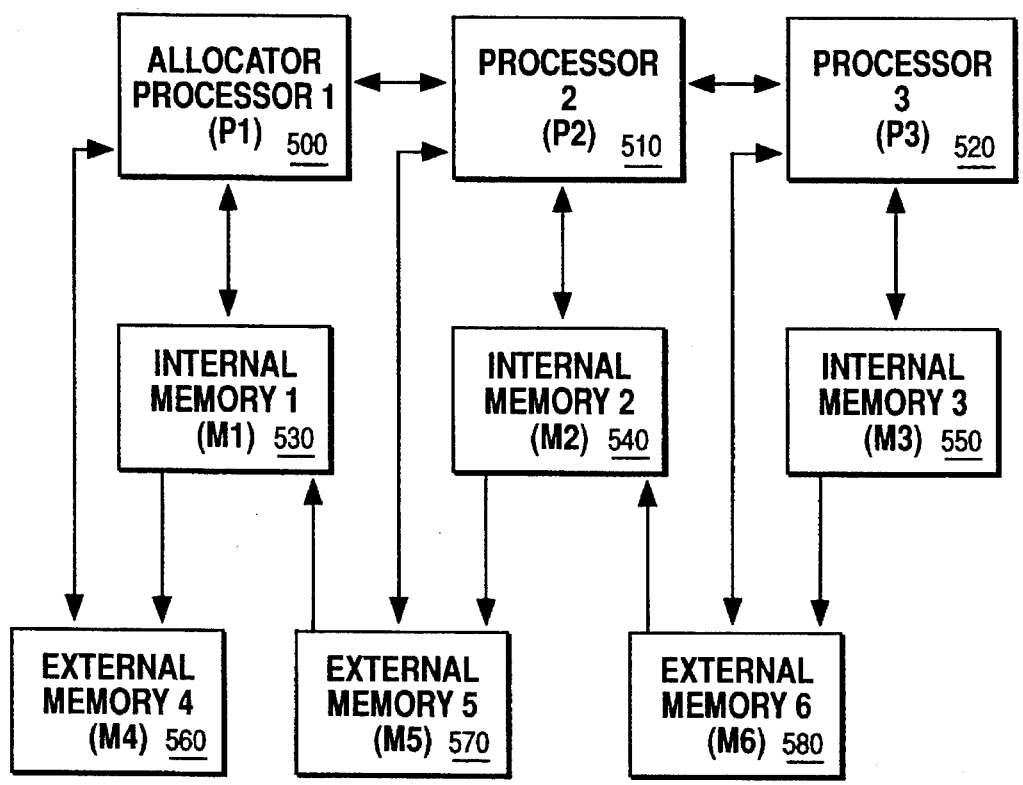
FIG. 6 is an illustration of pointers or a link list constructed from the pipeline map that the allocator could utilize for allocating tasks.

FIG. 6 is an illustration of pointers or linked lists 500–580 constructed from the pipeline map that the allocator could utilize for allocating tasks in the preferred embodiment. Note that the last memory in the pipeline 550 (M3) starts a linked list leading to the first memory 560 (M4) in the pipeline This is useful for the allocating processor to find information by simply walking from one memory data structure to another.

Figure 7:
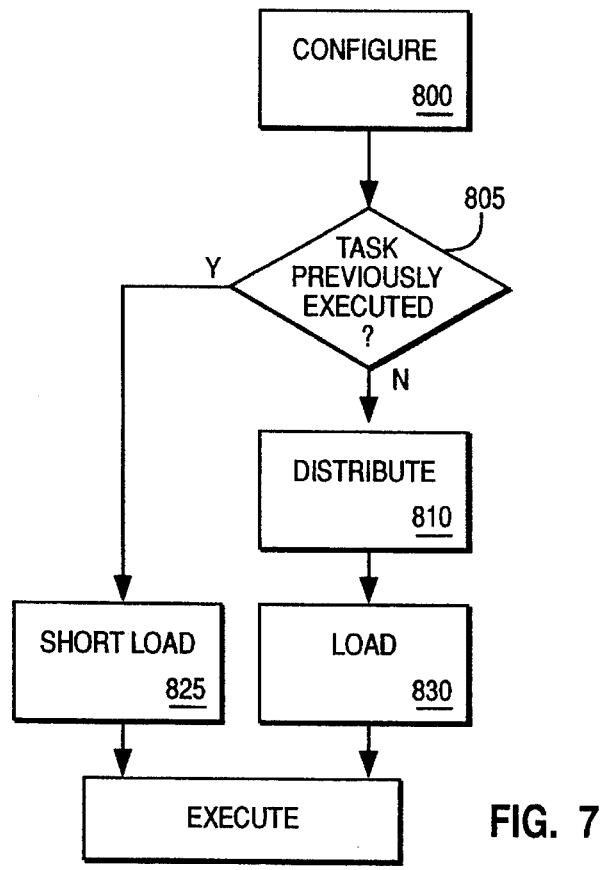
FIG. 7 is a high level flowchart of a method used to allocate or organize task for processing in the pipeline.

FIG. 7 is a high level flowchart of a method used to allocate or organize tasks for processing in the processing pipeline. In a first step 800 called Configure, the allocator builds a configuration list of routines to be executed to perform a given task. The configuration list includes the length of time needed to execute each routine and any initialization routines that need to be executed for each routine. The initialization routines set up certain attributes to be used by the routine or allocate working storage for the routine. In a second step 805, a configuration cache is checked to see if the task has been previously executed. If not, then in step 810 called Distribution, the allocator dynamically organizes or distributes the routines across the processors within the pipeline while utilizing the pipeline map described above, thereby grouping the routines or instructions into groups of routines or instructions to be processed by the processors in the pipeline. The distribution process is dynamic in that the organization or allocation of the routines or instructions is not predefined and may vary based on factors such as the length of time to process the instructions being allocated, the number of processors being utilized to execute the instructions, the current processing load on the processors, etc. It is in this step that data structures called process stacks are built. A process stack is a group of routines or instructions that a specific processor or processor unit would execute or process to perform its portion of the task. In the preferred embodiment, there is one process stack for each processor that executes any routines. In a subsequent step 820 called Loading, the process stacks are loaded with appropriate pointers to data and instructions in the appropriate memories to be executed by the processors. If the task had been performed before as determined by step 805 above, then an alternative Short Load step 825 would be performed wherein the process stacks are checked to ensure that all required routine and data pointers are loaded. In a final step 830 called Execution, the process stacks allocated to each processor in the pipeline are executed in sequence to perform the desired task. In the preferred embodiment, a subsequent task may then be processed as described above, including starting execution of the process stacks, before execution of the process stacks for the previous task has been completed. This is possible due to the fact that the processors in a pipeline may process the process stacks sequentially, yet independently.

Figure 8:
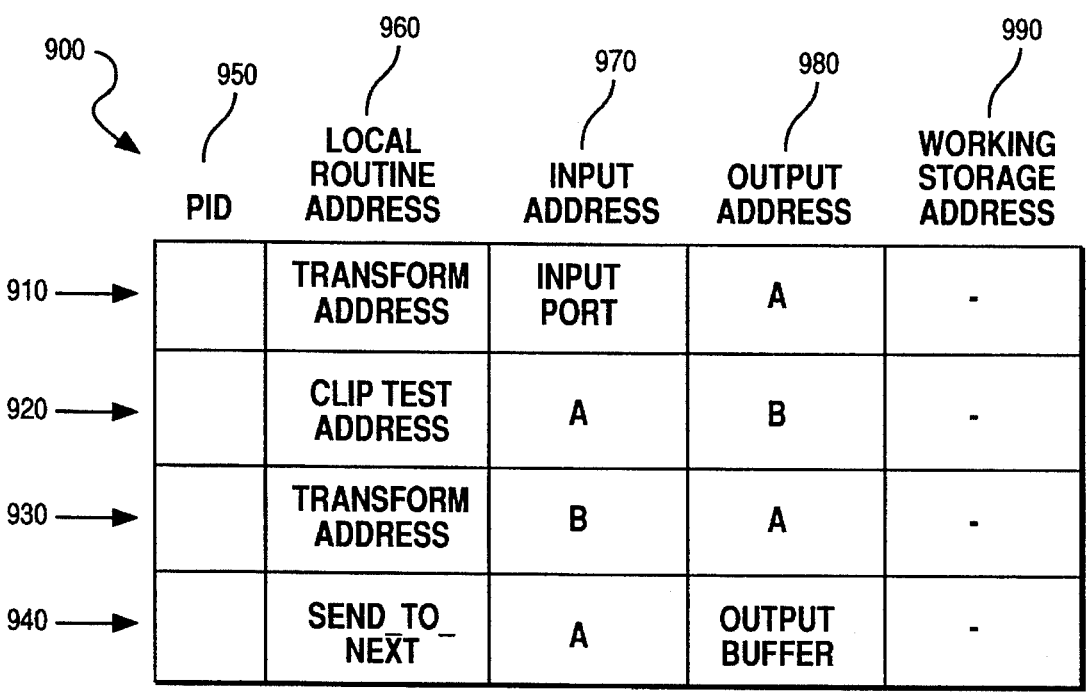
FIG. 8 is an illustration of a process stack that could be generated for a given set of routines.

FIG. 8 is an illustration of a process stack 900 that could be generated for a given set of routines. A process stack is a linked list of routines 910–940 to be executed. Each routine in the linked list performs some piece of world. The routine is a self-contained function requiring a process ID (PID) 950 for the routine, a local address 960 of the routine code, an input pointer 970 from which to obtain the routine input data, an output pointer 980 to which output data is written, and local information 990 such as a pointer to local working storage. This information is added to the process stack during the Load step described in more detail below. Each processor reads these pointers from its process stack entry, calls the routine with the pointer, then repeats the process for the next routine in the process stack. Because the process stack is a linked list, it can easily be built and manipulated by a controlling program dynamically.

Figure 9:
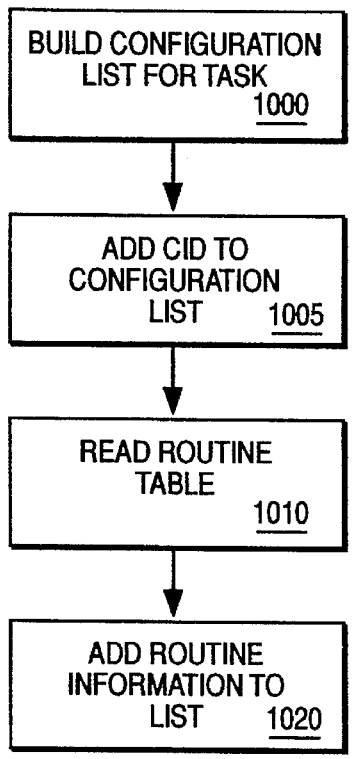
FIG. 9 is a more detailed flowchart of the Configuration step described in FIG. 7 above.

FIG. 9 is a more detailed flowchart of the Configuration step 800 described in FIG. 7 above. In a first step 1000, task splitting code for the given task is executed providing a configuration list of routines to be executed in sequence to accomplish the given task. The task splitting code takes into account the various current attributes of the system that were previously loaded in the system by attribute instructions. In a second step 1005, a Configuration ID (CID) for the type of task is added to the configuration list. In the preferred embodiment, the CID would be based on the path taken by the task splitting code in generating the configuration list. As a result, the CID would be the same for any subsequent task of the same type with the same current attributes. In a third step 1010, a routine table is searched for each routine in the configuration list to determine the length of time necessary to execute the routine and any restrictions on the routine. Routine restrictions include restrictions on which processor may execute the routine (such as the first processor must execute the routine due to the need to access an adapter input buffer or the last processor must execute the routine due to the need to access the frame buffer), external memory is required for this routine, and other possible routine restrictions. This information will be most useful during the Distribute step. However, these restrictions are not commonly used and do not normally present any difficulties during the Distribution step as will be discussed in more detail below. The routine list is then updated to reflect this information in step 1020.

Figure 11:
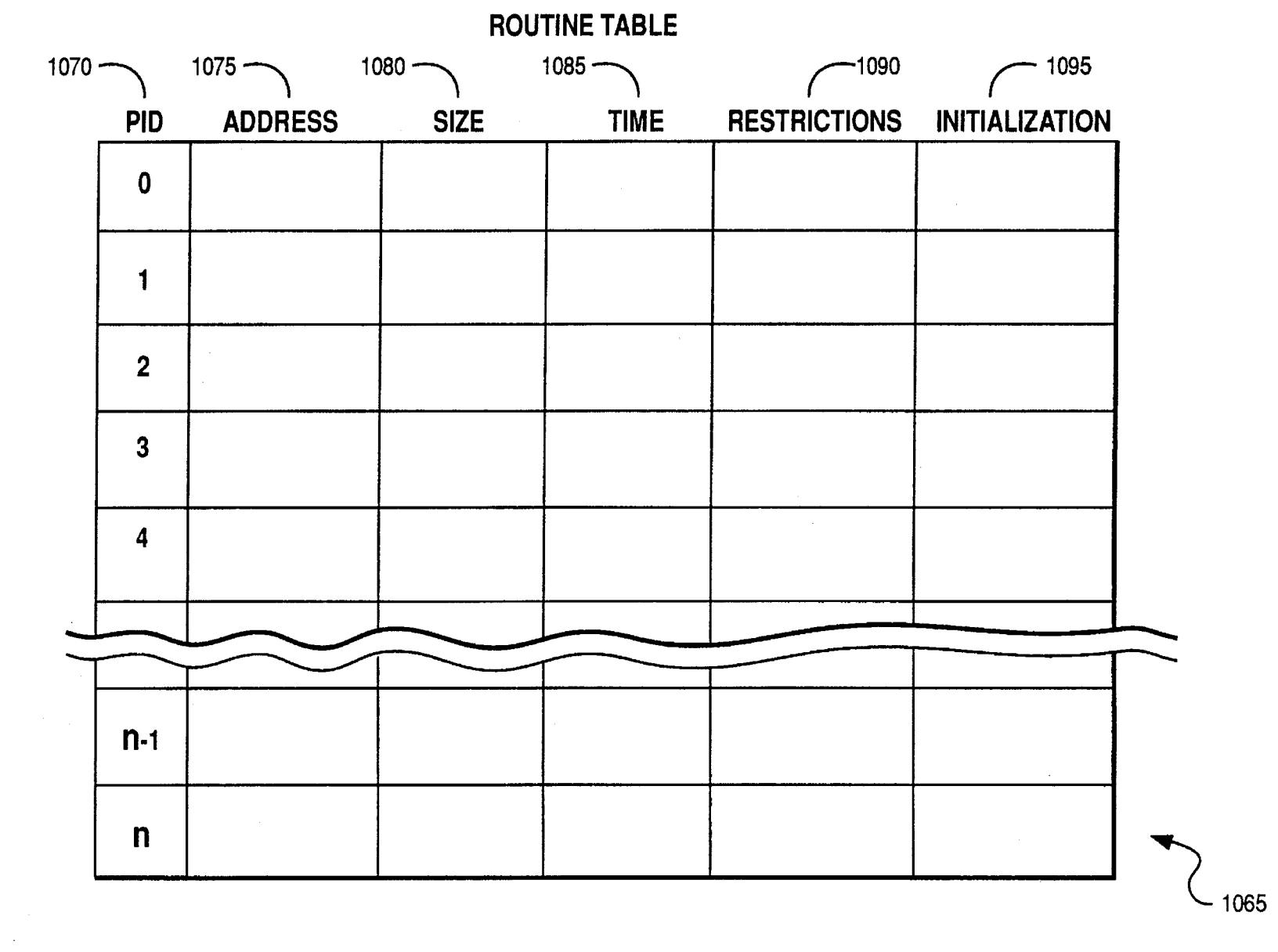

FIGS. 10 and 11 are illustrations of a configuration list 1040 and a routine table 1065 to be utilized in a preferred embodiment of the invention. The configuration list gives the process ID (PID) 1045 of each of the routines necessary to execute a given task, the time 1050 necessary to execute each routine, and any restrictions 1055 on allocating the routine. The configuration list also includes the CID 1060 of the type of task. The configuration list is generated during the Configuration step and is heavily utilized during the Distribution step. The routine table includes the PID 1070 of all known routines, the address 1075 of the routine code in the allocator memory, the size 1080 of each routine, the time 1085 necessary to execute each routine, any allocation restrictions 1090 on each routine, and sometimes a pointer 1095 to an initialization routine. Some of this information is used to complete the configuration list during the Configuration step. The remaining information is utilized during the Load step.

Figure 12:
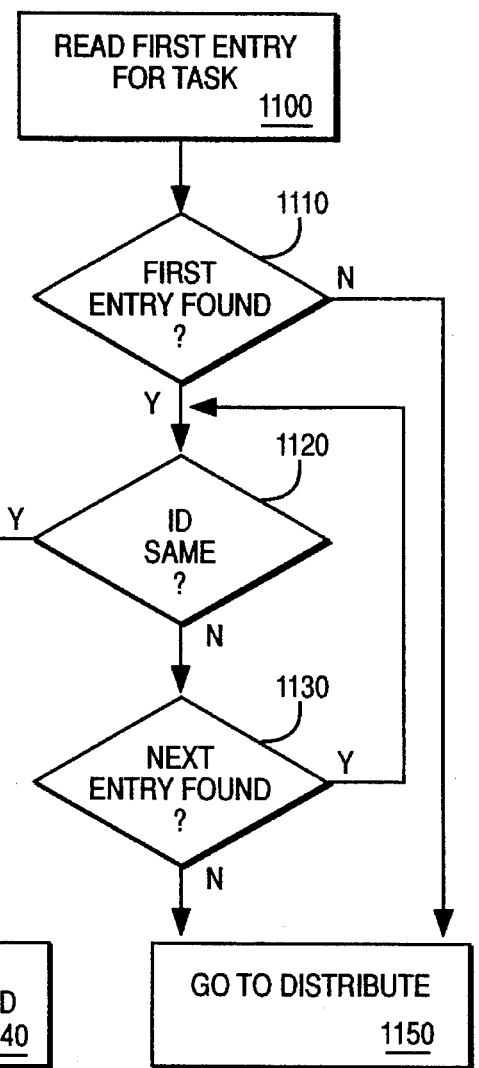
FIG. 12 is a more detailed flowchart of step 805 described in FIG. 7 above.

FIG. 12 is a more detailed flowchart of step 805 described in FIG. 7 above wherein it is determined whether this type of task has been executed before. In a first step 1100, the first entry for a given task in the configuration cache is read. If no first entry is found (step 1110), then processing continues forward to the Distribution step (step 1150) because the current task has not been executed previously with the same relevant attributes (such as the number of lights used in a model). If an entry is found for the given task in the configuration cache, then the Configuration ID of the entry is compared to the CID of the given task. If the CIDs are the same, then the same task with the same internal attributes has been previously executed. As a result, processing continues forward to the Short Load step (step 1140). If the CIDs are not the same, then the current entry is checked to see if there is another subsequent entry in the configuration cache (step 1130). If not, then processing continues forward to the Distribution step (step 1150) because the current task has not been executed previously with the same internal attributes. If yes, then processing continues back to step 1120.

FIG. 13 is an illustration of a configuration cache entry 1160 to be utilized in the preferred embodiment of the invention. The configuration cache entry includes the configuration ID (CID) 1165, a pointer 1170 to the next cache entry, a copy 1175 of previously executed process stacks, pointers 1180 to local memory addresses of previously executed process stacks, and load flags 1185 for each of the process stacks indicating which of the process stacks are still loaded into local memories. Other information 1190 may be included as desired.

Figure 14:
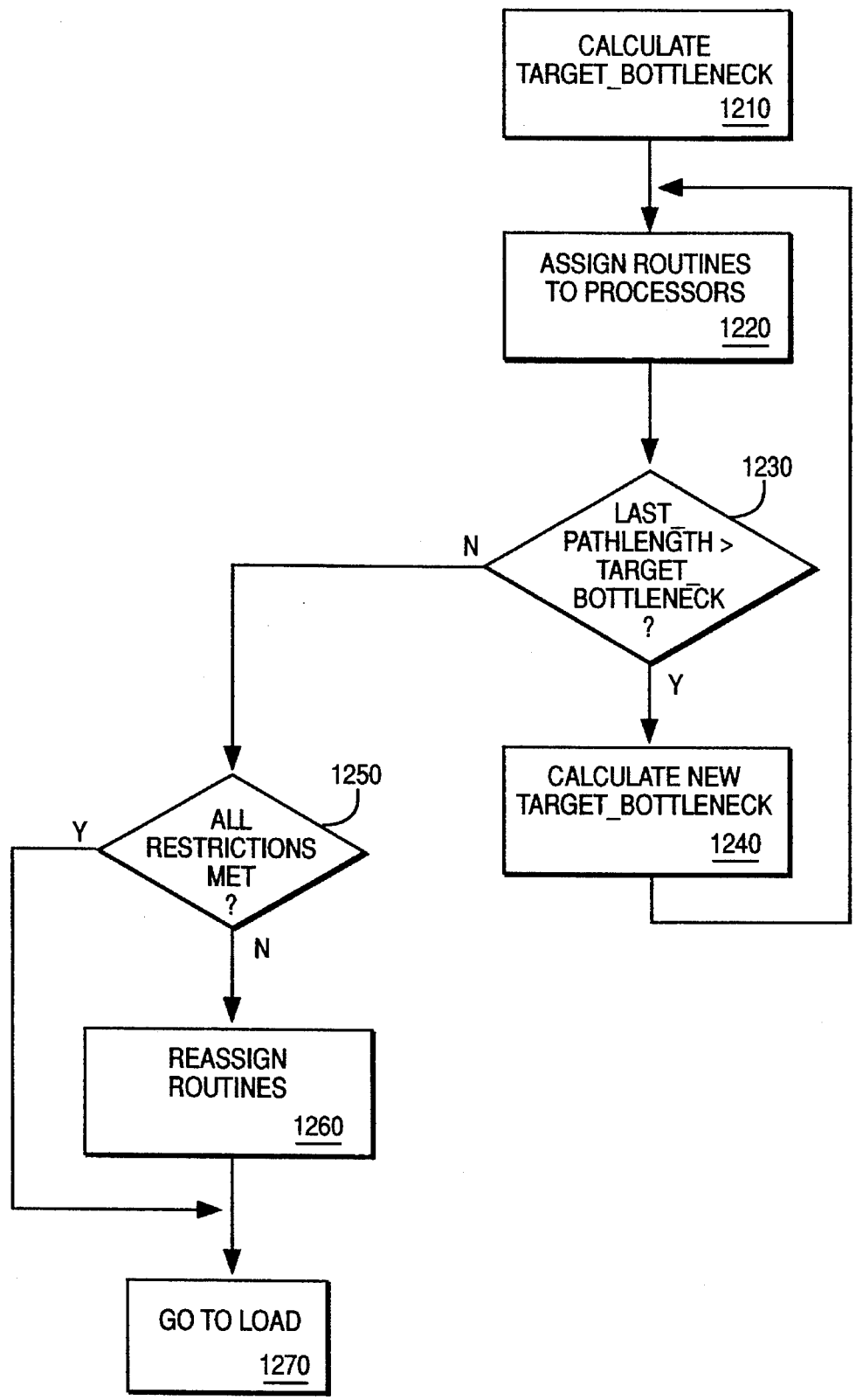
FIG. 14 is a more detailed flowchart of the Distribution step described in FIG. 7 above.

FIG. 14 is a more detailed flowchart of the Distribution step 810 described in FIG. 7 above. In a first step 1210, the allocator calculates a target bottleneck. This is the longest pathlength (time to execute routines) to be allocated to any processor. In the preferred embodiment, the target-bottleneck is calculated to be the sum of the pathlengths for all of the routines to be executed, as derived from the configuration list, divided by the number of processors. In a second step 1220, the routines listed in the configuration list are assigned to the processors in sequential order. It is during this process that the frameworks for the process stacks are built in the allocator's memory. The routines to be executed for a given processor are loaded into a process stack with one process stack for each processor executing routines. The assignment of routines to processors is described in more detail below. In a third step 1230, it is determined whether the last processor is assigned more pathlength than the target-bottleneck. If yes, then a new target-bottleneck is calculated in step 1240, and the assignment process of step 1220 is begun again. The calculation of a new target-bottleneck is described in more detail below in FIG. 16. If all of the processors are assigned a pathlength less than or equal to the target-bottleneck, then the routine restrictions listed in the configuration list are checked in step 1250 to determine whether the restrictions are met by the current assignment of the routines to the processors. If the restrictions are met, then the process is continued to the Load step in step 1270. If the restrictions are not met, then the routines and any intervening routines are reassigned to the appropriate processors in step 1260. For example, if a routine is assigned to the second processor in the pipeline, but the routine is restricted to the first processor in the pipeline, then the routine and any other preceding routines assigned to the second processor are reassigned to the first processor. Once the reassignment step is completed, then the process is continued to the Load step in step 1270.

Figure 15:
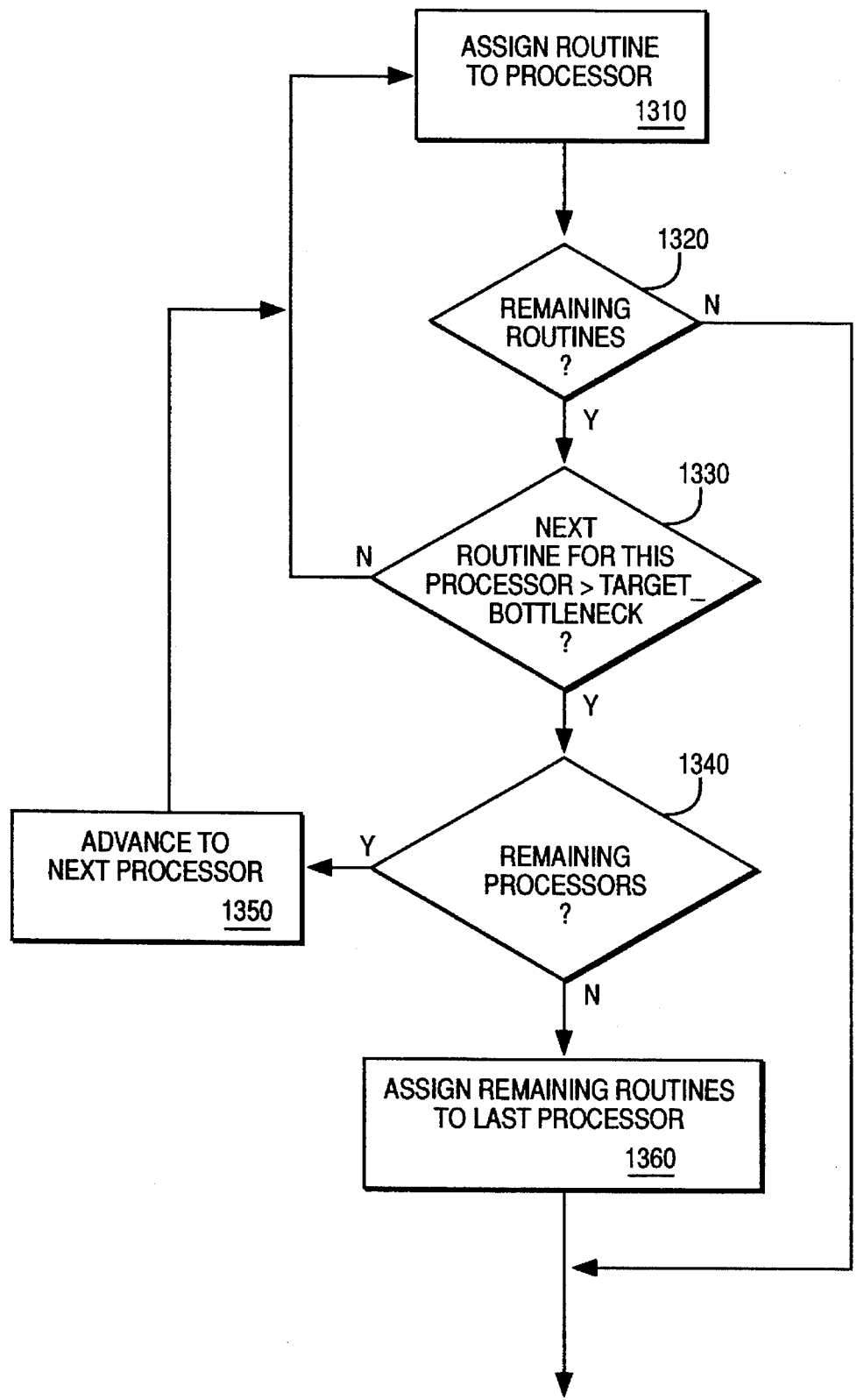
FIG. 15 is a more detailed flowchart of the assignment step described in FIG. 14 above.

FIG. 15 is a more detailed flowchart of the assignment step 1220 described in FIG. 14 above. In a first step 1310, the first routine is assigned to the first processor. During this assignment, the routine pathlength, given in the configuration list, is entered into a current assigned pathlength for the processor receiving the routine. The processor data structure may be used to temporarily hold the current assigned pathlength. In a second step 1320, the allocator determines whether any routines are remaining in the configuration list for allocation to the processors. Since this is the first time entering step 1320, the answer is probably yes. In the next step 1330, the current pathlength assigned to the processor plus the pathlength of the next routine to be assigned is compared to the target-bottleneck. If the amount is not greater than the target-bottleneck, then the next routine is assigned to the processor in step 1310 and the routine pathlength is added to the current assigned pathlength for the current processor. This process repeats until the pathlength of the next routine cannot be added to the pathlength assigned to the processor without exceeding the target-bottleneck. In step 1340, the allocator then determines whether another processor remains to be assigned routines by looking for a next processor in the processor data structure. If yes, then the assignment process advances to the next processor in step 1350 by accessing its processor data structure. A routine is then assigned to the processor in step 1310 and the routine pathlength is entered into the current assigned pathlength for the processor receiving the routine. If no to step 1340, then in step 1360 the remaining routines are assigned to the last processor and the routine pathlengths are added to the current assigned pathlength of the last processor.

Figure 16:
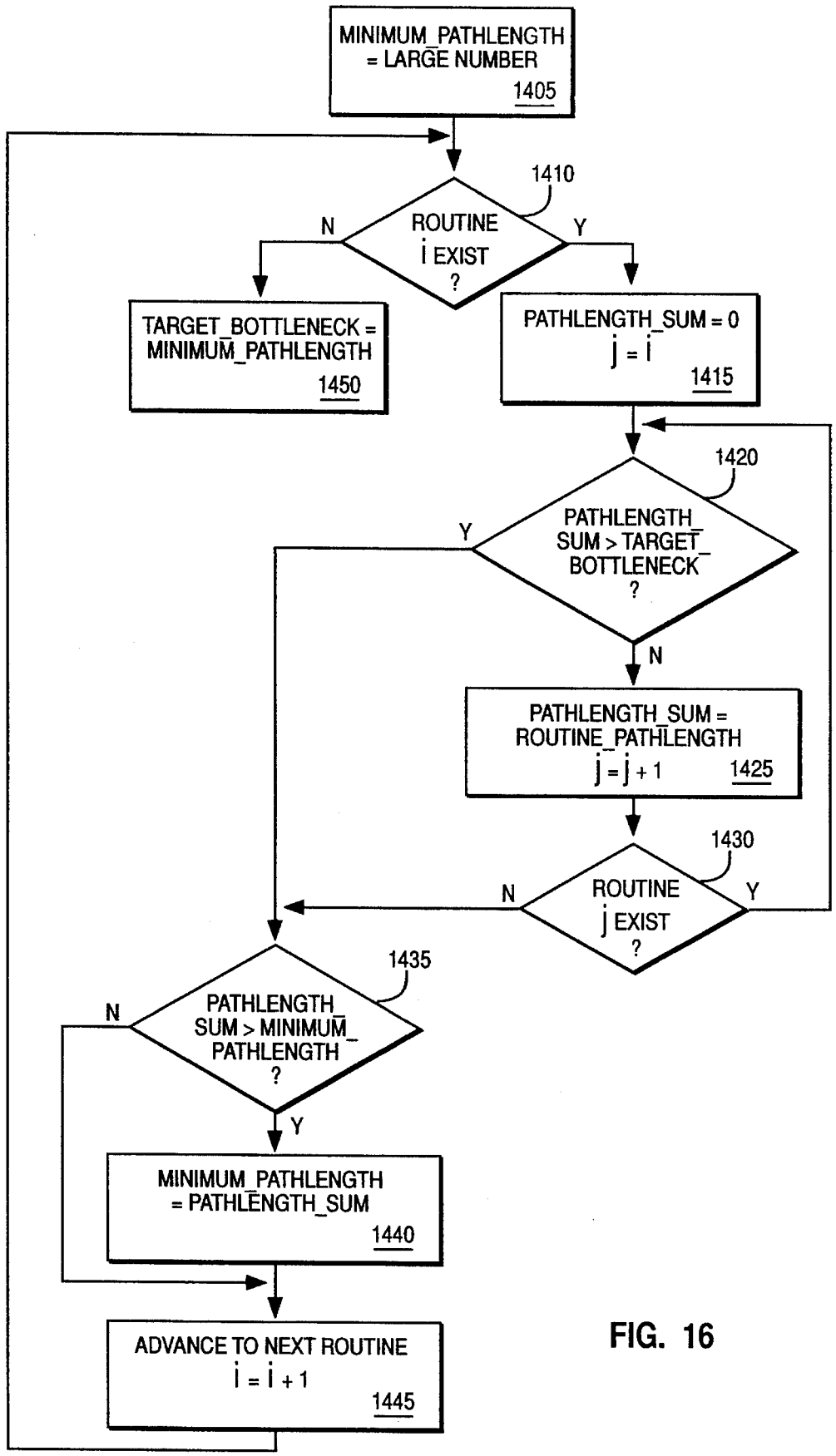
FIG. 16 is a more detailed flowchart of the new target-bottleneck calculation step described in FIG. 14 above.

FIG. 16 is a more detailed flowchart of a preferred new target-bottleneck calculation step described in FIG. 14 above. In this process, the goal is to obtain a new target bottleneck that is equal to the minimum linear sum of paths greater than the current target bottleneck. In a first step 1405, the variable minimum-pathlength is initialized by setting it to its largest possible value and a counter i is set to 1. In a second step 1410, it is determined whether routine i in the configuration list exists. Since this is the first routine (i =1), the answer is yes. In the next step 1415, the pathlength-sum is set to 0 and a counter j is set equal to counter i. In step 1420, it is determined whether the pathlength-sum is greater than the target-bottleneck. Since this is the first time through, the answer is no. In step 1425, the routine pathlength given in the configuration list is added to the pathlength-sum and the process is advanced to the next routine by incrementing the counter j by 1. ID step 1430, it is determined whether routine j is in the configuration list. If yes, then processing is returned to step 1420. If no or if yes to step 1420 above, step 1435 determines whether the pathlength-sum is less than the minimum-pathlength. If yes, then step 1440 sets the minimum-pathlength equal to the pathlength-sum. Step 1445 then increments counter i to begin processing for the next set of routines. Step 1410 then determines whether routine i exists in the configuration list. If no, then processing returns to step 1220 of FIG. 14.

Figure 17:
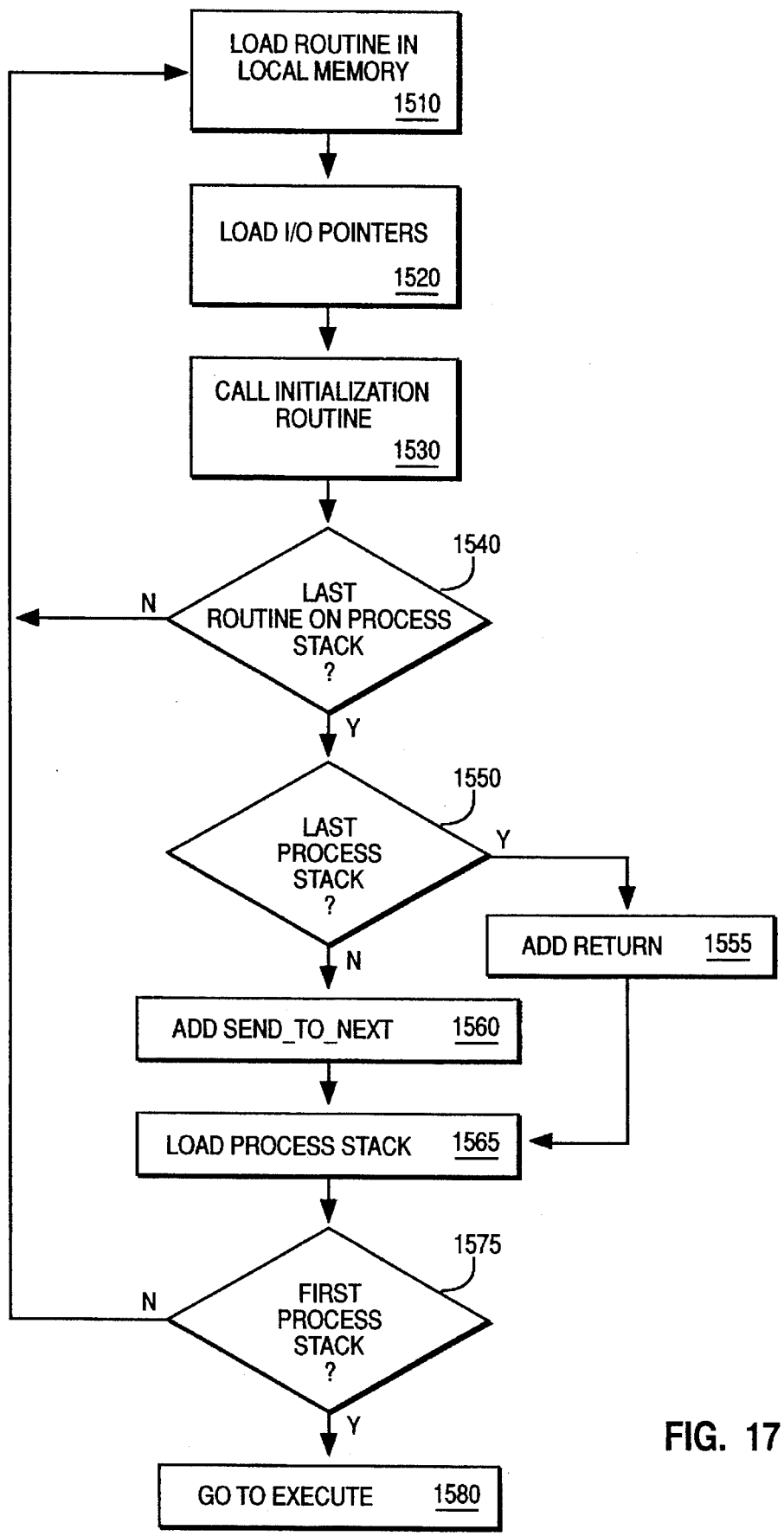
FIG. 17 is a more detailed flowchart of the Load step described in FIG. 7 above.

FIG. 17 is a more detailed flow chart of the Load step described in FIG. 7 above. It is preferred to start with the process stack for the last processor and work backwards to the process stack for the first processor. This makes it easier to load the process stacks as a linked list with pointers from the first process stack to the last process stack. In a first step 1510, the address of the first routine of the last process stack is read from the routine table with the process ID (PID) obtained from the process stack. The routine is then copied to local memory, preferably internal memory, accessible by the processor. The local routine address is then loaded into the routine address in the process stack. In step 1520, the input and output pointers are also generated for the input and output addresses for the data used and generated by the routine. Given that this is the first routine in the process stack, the input pointer is the input port address. The output pointer is to a local address in internal memory accessible to the processor. In step 1530, an initialization routine is called if one is designated by the routine table as being available for that routine. This initialization routine loads the attributes to be used by the routine such as window location, transforms, light information, etc. into local memory. In addition, the initialization routine sets up any local or working storage needed for the routine in local memory. A pointer to the working storage is loaded into the process stack. During the allocation of memory for the routine, the input and output buffers, and the working storage, the copies of previously executed process stacks stored in the configuration cache are checked to see what memory space is available. If memory previously allocated to a previously executed process stack is reallocated to the current process stack, then a load flag for the process stack in the configuration cache is turned off. This indicates that the resources for the previously executed process stack are no longer allocated to that process stack. This flag is used in the Short Load step described in more detail below. In step 1540, it is determined whether this is the last routine on the process stack. If no, then execution returns to step 1510 for loading the next routine in the process stack. If yes, then step 1550 determines whether this is the last process stack (the first to be loaded but the last in the linked list of process stacks). If yes, then step 1555 adds a final routine to the process stack called return which, when executed during the Execution step, completes the execution of the process stacks. If no, then step 1560 adds a final routine called send-to-next to the end the current process stack for the purpose of moving data between processors. The input for this routine is the output address of the previous routine and the output address is the output buffer address for the processor. Step 1565 then loads the process stack as well as a pointer to the process stack into local memory and into the configuration cache. In addition a turned on load flag for the process stack is stored in the configuration cache indicating that the process stack and its resources are loaded into local memory. Step 1575 then determines whether this is the first process stack (the last to be loaded but the first in the linked list of process stacks). If no, then execution returns to step 1510 for adding the first routine of the previous process stack. If yes, then processing continues to the Execution step as shown in step 1580.

Figure 18:
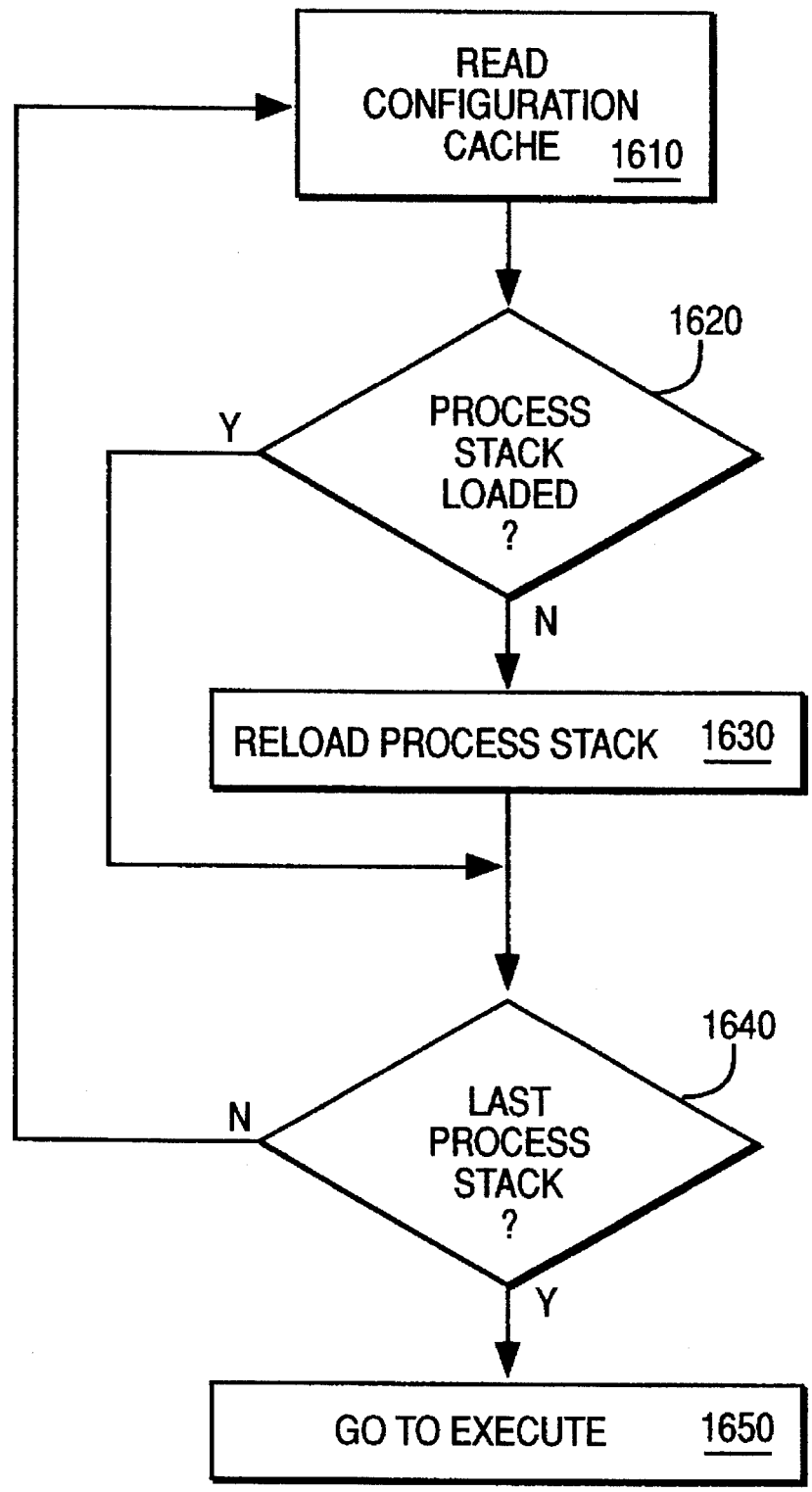
FIG. 18 is a more detailed flow chart of the Short Load step described in FIG. 7 above.

FIG. 18 is a more detailed flow chart of the Short Load step described in FIG. 7 above. As in the Load step described above, it is preferred to start with the process stack for the last processor and work backwards to the process stack for the first processor. This makes it easier to reload the process stacks as a linked list with pointers from the first process stack to the last process stack should that be necessary. In a first step 1610, the configuration cache is read for the last process stack for the given task and attributes. In step 1620, the load flag for the process stack is checked to see if the process stack is still loaded. If no, then in step 1620 the process stack is reloaded into local memory as described above during the Load step. This includes reloading the routines, input pointers, output pointers, rerunning the initialization routine(s), etc. If yes to step 1620 or after the reloading of the process stack, it is determined whether the last process stack has been read from the configuration cache. If no, then processing returns to step 1610. Otherwise, then step 1650 proceeds to the Execution step.

FIG. 19 illustrates a set of process stacks 1700–1900 for execution that could be generated by the above described Configure, Distribute and Load steps for the pipeline described in FIG. 2. The process stacks include routines that would render a triangle in a three dimensional model with one ambient and two directional lights. Process stack execution begins by the first processor executing the first routine 1710 in the first stack 1700. In this case it would be the mesh input routine located at the local address given in the process stack. The routine picks up its input/output and local static or working storage pointers from the process stacks and performs its function. The routine reads data from the input pointer, in this case the M1 input port address, and passes the results to the output pointer, in this case M1-A. If needed, the routine uses working storage also allocated to the process stack. Processing then advances to the next routine 1720 for execution. The last routine 1740 to be executed in the process stack 1700 is a send-to-next routine. This routine starts a direct memory access (DMA) transfer of the data to the next processor. After the send-to-next routine has been called, the processor prevents the output buffer, pointed to by the send-to-next output pointer, from being written to until the send-to-next routine is completed. As a result, the processor may begin processing a subsequent process stack for a subsequently allocated task. In the current case, after the send-to-next routine is completed, processing continues to the second processor wherein the second process stack 1800 is executed. The ambient light routine 1810 is executed utilizing the M2 input port address for input and M2-A for output. Again the second processor continues to the send to next routine wherein the routine is executed. Processing continues to the process stack 1900 for the third processor. These routines are executed until the last routine. The last routine 1930 on the last stack 1900 is a return routine which causes execution to cease as the task is now completed.

It is an advantage of the present invention that the pipeline may be easily modified by adding or subtracting processors or memories or by changing the relationships between the processors and/or memories. The user should then simply reconfigure the pipeline map representing the pipeline and erase the configuration map containing previously allocated process stacks. This allows the allocator to easily rebalance the tasks across the pipeline by reallocating the process stacks for the new pipeline configuration while utilizing the modified pipeline map.

Although the present invention has been fully described above with reference to specific embodiments, other alternate embodiments will be apparent to those of ordinary skill in the art. For example, the allocator may be used for multiple pipelines wherein each pipeline is allocated tasks according to need. In addition, each processor described above may include multiple processing units. These multiple processing units may also be organized into a multiprocessor pipeline. In addition, the processing pipeline may also utilize shared memory. Alternative distribution schemes may also be used. Furthermore, the method of detecting previously executed process stacks that are no longer loaded may be accomplished using a load map separate from the configuration cache. Therefore, the above description should not be taken as limiting the scope of the present invention which is defined by the appended claims.

We claim:

1. An apparatus for processing high level instructions comprising:

a) a plurality of processing units including at least a first processsing unit and a second processing unit:

b) means for generating a plurality of instructions to perform a high level instruction;

c) means for predetermining a length of time for processing each said generated instruction; and means, coupled to the predetermining means, for dynamically organizing said generated instructions into at least a first group and a second group based on the predetermined length of time for processing each instruction, each instruction in said first group to be processed by said first processing unit prior to any instructions of said second group being processed by said second processing unit, each group including at least one instruction to be processed by one of said plurality of processing units.

2. The apparatus of claim 1 wherein said processing units include means for processing each instruction in each said group of instructions sequentially.

3. The apparatus of claim 2 further comprising means for coupling said processing units into at least one serial chain.

4. The apparatus of claim 3 further comprising means for coupling said processing units into a plurality of serial chains.

5. The apparatus of claim 3 further comprising means, coupled to the organizing means, for providing an organization description of said processing units.

6. The apparatus of claim 5 wherein the organizing means includes means for dynamically organizing the instructions into said groups based on the predetermined length of time for processing each instruction and the provided organizing description of said processing units.

7. the apparatus of claim 6 wherein at least one of said processing units includes a plurality of processors.

8. The apparatus of claim 6 further comprising means, coupled to the organizing means, for providing a description of memory resources available for each of said processing units.

9. The apparatus of claim 1 further comprising means for distributing each said group of instructions to one of said processing units for processing.

10. The apparatus of claim 1 wherein said means for predetermined includes predetermining an order of execution for processing each instruction and wherein said means for dynamically organizing includes dynamically organizing said generated instructions into at least one group based on the predetermined order of execution.

11. A computer implemented method of processing high level instructions by plurality of processing units, comprising the steps of:

a) generating a plurality of instructions to perform a high level instruction;

b) predetermining a length of time for processing each said generated instruction; and c) dynamically organizing said generated instructions into at least a first group and a second group memory based on the predetermined length of time for processing each instruction, each instruction in said first group to be processed by said first processing unit prior to any instructions of said second group being processed by said second processing unit, each group including at least one instruction for processing by one of said plurality of processing units.

12. The method of claim 11 further comprising the step of processing each instruction in each said group of instructions sequentially.

13. The method of claim 12 further comprising the step of processing said groups sequentially by said processing units.

14. The method of claim 13 further comprising the step of providing an organization description of said processing units.

15. The method of claim 14 wherein the step of organizing includes dynamically organizing the instructions into said groups based on the predetermined length of time for processing each instruction and the provided organization description of said processing units.

16. The method of claim 15 further comprising the step of providing a description of memory resources available for each of said processing units.

17. The method of claim 11 further comprising a step of distributing each said group of instructions to one of said processing units for processing.

18. The method of claim 11 wherein said steps of predetermining includes predetermining an order of execution for processing each instruction and wherein said steps of dynamically organizing includes dynamically organizing said generated instructions into at least one group based on the predetermined order of execution.

19. An apparatus for processing high level instructions comprising a computer system including:

a) a plurality of processing units;

b) means for generating a plurality of instructions to perform a high level instruction;

c) means for predetermining a length of time for processing each said generated instruction; and d) means, coupled to said predetermining means, for dynamically organizing said generated instructions into at least a first group and a second group based on the predetermined length of time for processing each instruction, each instruction in said first group to be processed by said first processing unit prior to any instructions of said second group being processed by said second processing unit, each group including at least one instruction to be processed by one of said plurality of processing units.

20. The apparatus of claim 19 wherein said processing units include means for processing each instruction in each said group of instructions sequentially.

21. The apparatus of claim 20 wherein the computer system further includes means for coupling said processors into at least one of serial chain.

22. The apparatus of claim 21 wherein the computer system further includes means for coupling said processing units into a plurality of serial chains.

23. The apparatus of claim 21 wherein the computer system further includes means, coupled to the organizing means, for providing an organization description of said processing units.

24. The apparatus of claim 23 wherein the organizing means includes means for dynamically organizing said instructions into said groups based on the predetermined length of time for processing each instruction and the provided description of said processing units.

25. The apparatus of claim 24 wherein at least one of said processing units includes plurality of processors.

26. The apparatus of claim 24 wherein the computer system further includes means, coupled to the grouping means, for providing a description of memory resources available for each of said processing units.

27. The apparatus of claim 19 further comprising means for distributing each said group of instructions to one of said processing units for processing.

28. The apparatus of claim 19 wherein said means for predetermining includes predetermining an order of execution for processing each instruction and wherein said means for dynamically organizing includes dynamically organizing said generated instructions into at least one group based on the predetermined order of execution.

* * * * *